United States Patent [19]

Krüger et al.

[11] Patent Number: 4,964,943
[45] Date of Patent: Oct. 23, 1990

[54] DEVICE FOR THERMALLY JOINING ENDS OF CONVEYOR BELTS

[75] Inventors: Manfred Krüger; Franz-Erich Schulte Strathaus, both of Unna, Fed. Rep. of Germany

[73] Assignee: F. E. Schulte Strathaus KG

[21] Appl. No.: 155,715

[22] PCT Filed: May 2, 1987

[86] PCT No.: PCT/DE87/00195

§ 371 Date: Jan. 7, 1988

§ 102(e) Date: Jan. 7, 1988

[87] PCT Pub. No.: WO87/06876

PCT Pub. Date: Nov. 19, 1987

[30] Foreign Application Priority Data

May 10, 1986 [DE] Fed. Rep. of Germany ....... 3615879

[51] Int. Cl.$^5$ .................. B29C 43/32; B30B 15/06
[52] U.S. Cl. .................... 156/498; 100/93 P; 156/283.1; 165/64; 219/243; 249/78; 249/79; 425/384; 425/DIG. 13
[58] Field of Search ................. 249/78, 79; 156/583.1, 156/583.4, 583.7, 583.9, 498; 219/243, 254, 255, 245; 425/DIG. 13, 384; 100/92, 93 P, 295; 165/64

[56] References Cited

U.S. PATENT DOCUMENTS

| 259,054 | 6/1882 | Seely | 219/245 |
| 829,808 | 8/1906 | Shipp | 219/544 |
| 1,415,550 | 5/1922 | Hadaway | 219/243 |
| 1,758,703 | 5/1930 | Johnson | 219/544 |
| 1,984,008 | 12/1934 | Baker | 219/243 |
| 3,393,292 | 7/1968 | Ritscher | 219/254 |
| 4,278,877 | 7/1981 | Werych | 219/544 |
| 4,295,628 | 10/1981 | Kupf et el. | 249/80 |
| 4,408,520 | 10/1983 | Wons et al. | 100/93 P |
| 4,501,951 | 2/1985 | Benin et al. | 219/243 |
| 4,703,154 | 10/1987 | Ikegami et al. | 219/544 |

FOREIGN PATENT DOCUMENTS

| 437665 | 11/1926 | Fed. Rep. of Germany . |
| 3017559 | 11/1981 | Fed. Rep. of Germany . |
| 3112651 | 10/1982 | Fed. Rep. of Germany . |
| 894040 | 12/1944 | France . |
| 1002218 | 3/1952 | France | 219/544 |
| 975114 | 11/1964 | United Kingdom . |

OTHER PUBLICATIONS

Webstes 7th Colligate Dictionary Merrian Webster, Springfield, pp. 40 and 589.

Primary Examiner—Willard Hoag
Attorney, Agent, or Firm—Toren, McGeady & Associates

[57] ABSTRACT

A press platen, for bonding ends of a conveyor belt, having both heating and cooling means, the heating means being electrical resistance elements positioned in grooves bars, within the platen, which bars also define cooling channels therein.

11 Claims, 4 Drawing Sheets

DEVICE FOR THERMALLY JOINING ENDS OF CONVEYOR BELTS

TECHNICAL FIELD

The invention is directed to a device for thermally joining at least two parts, especially ends of conveyor belts, with pressure plates provided with heating- and cooling elements on the inside.

BACKGROUND ART

Conveyor installations operating with conveyor belts must frequently change their position for instance in open pit as well as underground operation, for instance if a region to be stripped advances slowly in the working zone and the conveyor means must follow this advance movement. This involves cutting the belts, re-erecting the installation and joining the ends together again, for which purpose heatable pressure plates are utilized, as they are known from the species defining DE-AS No. 27 27 300 of the applicant.

DISCLOSURE OF INVENTION

These already very satisfactory pressure plates, and this is the task of the invention, are to be further improved, especially as far as their economical fabrication is concerned. The appliance utilized for the vulcanizing process is to meet at least the criteria as they are already described in the species defining DE-AS No. 27 27 300. On the one hand it must achieve an optimum heating output, on the other hand it must also be able to be cooled advantageously. The device in the invention fulfills this in a particularly optimum manner due to its basic construction.

In order to for instance be able to appropriately locate heating conductors, the invention also provides that at least a portion of the channels formed by the profiling are connected with each other by arc-shaped channels in their front end regions. Thus a plurality of location patterns for instance for electrical resistance wires are available. These can be laid in undulating shape, in meandering shape from the inside towards the outside in several loops, which can then possibly be energized electrically in different ways, and more of the same. The arc-shaped connection of the individual channels with each other must not necessarily be achieved by separate components. Here grooves fashioned in the aluminum rods can also be fabricated in an arc-shaped manner, possibly by milling or the like.

The invention provides in another refinement that the channels formed by the sections are partially at least equipped with resistance heating elements, which are fixedly arranged in these channels however possibly so as to be longitudinally displaceable. It has been shown to be practical if the channels are designed to be essentially semicircular in cross-section, to insert the resistance heating elements into the base of the thus formed channel to seal the open trough oriented upwards devoid of any air with a bar section, for instance by squeezing. With this the resistance heating element is gripped so as to be entirely fixed as far as its location is concerned. Depending upon the area of application, a longitudinal mobility for the resistance heating wire can also be provided within the hollow channel formed in such a manner.

The invention provides in another embodiment that at least one longitudinal channel for receiving a resistance element and an additional longitudinal channel spatially separated from the first longitudinal channel for forming a cooling duct is provided in a bar-shaped aluminum section. Naturally several channels can be fashioned in one single aluminum section. The profile shape particularly on the longitudinal edge of such light metal sections can be chosen in such a way, that a complete channel is formed by placing the sections next to each other, possibly if the longitudinal edges are provided with a quarter-circular shaped phase, so that a semicircle for instance as a cooling duct is formed if the sections are placed next to each other.

The invention however is not limited to only arc-shaped channel or groove cross-sections. It can be equally provided that the channels or longitudinal grooves as far as their cross-section is concerned are designed to be triangular, quadrilateral, rectangular, polygonal and/or shaped like a circular segment or from mixed shapes of these geometrical basic shapes.

Because of the heat distribution occurring in appliances of this type it can for instance be appropriate if the channels receiving the heating elements are smaller in cross-section than the cooling channels, in order to be able to transport larger quantities of cooling media through said cooling channels.

The invention also provides to arrange the aluminum sections in a steel housing. Such a steel housing is appropriately completely closed in its functional position, if one neglects the entrance and exit of electric current and the supply lines for cooling air. This for instance does not expose any aluminum components to the outside, which is particularly desirable when used underground in present circumstances.

It has been seen that the wall structure of such a device can be achieved in such a manner that the sheathing consists of Cr-Ni-metal plates upon which the aluminum sections rest in a flush manner.

The invention provides in a somewhat differing embodiment that the wall structure facing the heating side consists of the following layers from the outside to the inside: Cr-Ni-metal plate, heat insulator layer, Cu-metal plate, heat insulator layer and Al-bar sections. This wall structure has proved itself in tests, without limiting the invention to this single embodiment.

It can also be provided in the invention that a layer consisting of an additional light metal plate as corrugated- or zigzag sheet metal with interposition of additional layers is placed upon the Al-bar sections containing the heating- and cooling channels, wherein the sheet metal profiling in its extent is oriented transversely to the extent of the heating- and cooling channels.

It is essential here, as also provided in the invention, that a high transverse stiffness is achieved by the transverse positioning of light metal sections or—rod sections, while the longitudinal stiffness compared to that is small; a possible ratio of these two stiffnesses can amount to 3:1.

This design achieves that the plates arch upwards transversely to the longitudinal direction of the belt when heated, meaning that they come to rest on the inside to begin with and then come into heating contact slowly towards the external edges.

Thus it is achieved with simple means that the gases which are formed during the vulcanization process are automatically pressed outwards, so that one achieves optimum results in actual practice.

BRIEF DESCRIPTION OF DRAWING

In the following the invention is described with particularity with the help of examples in the drawing. It is shown on FIG. 1 the three-dimensional illustration of a device in the invention in one of the embodiment variants, FIG. 2 a partial cross-section through two light metal sections placed next to each other with heating conductors, FIG. 3 a plan view of the lower plane of a heating plate, partially broken open, FIG. 4 a plan view of the upper plane of a heating plate, partially broken open, FIG. 5 a section along line V—V in FIG. 4, FIG. 6 a section along line VI—VI in FIG. 4, as well as in FIG. 7 a partial section along line VII in FIG. 3.

The device presented by way of a cutout in perspective and designated generally with 1 consists of several layers in essentially two planes, which are designated in FIG. 1 with "O" for the upper plane and "U" for the lower plane. It should already be mentioned at this time that as a rule at least one lower and upper heating plate forms part of a vulcanization installation, which plates are arranged to be clampable by clamping means with each other. The expression "top" and "bottom" refers in this case to the positioning in FIG. 1. In actual practice the plate located beneath the ends of the belt would be arranged exactly in mirror image fashion. The plate structure illustrated in FIG. 1 is herein the following:

Figure 1:
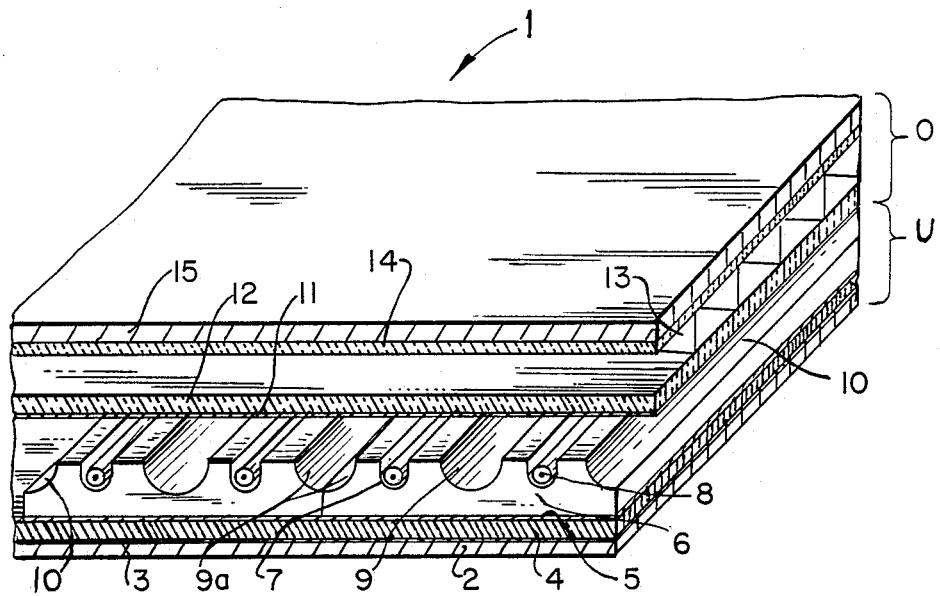

A heat insulation plate 3 is placed upon a lower housing plate 2 made from chromium nickel steel, which on its part carries a copper plate 4, which again is covered by a heat insulating plate 5. Aluminum bar sections 6 are placed upon the second heat insulation layer, which are equipped with channels at their upper outer surface referred to the illustration in FIG. 1, and indeed with small channels 7 of approximately semicircular cross-section for receiving the resistance heating elements 8 and larger profile channels as cooling channels 9 also with semicircular cross-sections.

The light metal sections 6 comprise bevels 10 shaped in the manner of a quarter circle on their edge sides, which as FIG. 1 shows are complemented by their adjacent section quarter circles to form semicircles 9a.

This lower region of the plates designated with "U" is closed off by an aluminum plate 11, on which a heat insulation plate 12 is arranged in the illustrated example. This heat insulating plate 12 carries a zigzag aluminum plate 13 or correspondingly formed profiles, which heat insulating plate is arranged transversely to the extent of the channels 7 or 9 as far at the orientation of the zigzag undulation is concerned. This light metal zigzag- or corrugated sheet metal plate 13 is closed off towards the top by an additional heat insulating layer 14, wherein finally follows to the outside an external Cr-Ni-steel plate 15 as an external sheathing.

Figure 2:
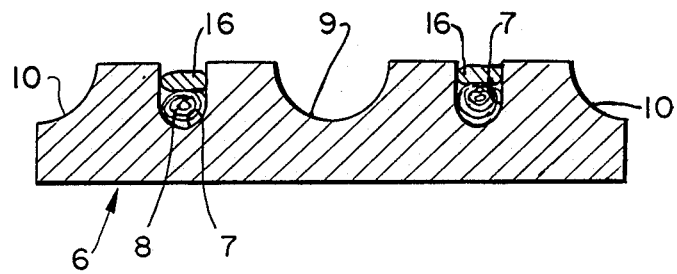

FIG. 2 illustrates the basic structure of a preferred cross-sectional shape of the light metal bar section 6 again in magnification. The jacketed resistance heat conductors 8 are inserted in the section troughs or profile channels 7 of smaller cross-section. The channel 7 is covered from the top by an aluminum flat bar 16, which is squeezed there into said channel and thus retains the heating element 8 in a clamping manner.

Figure 3:
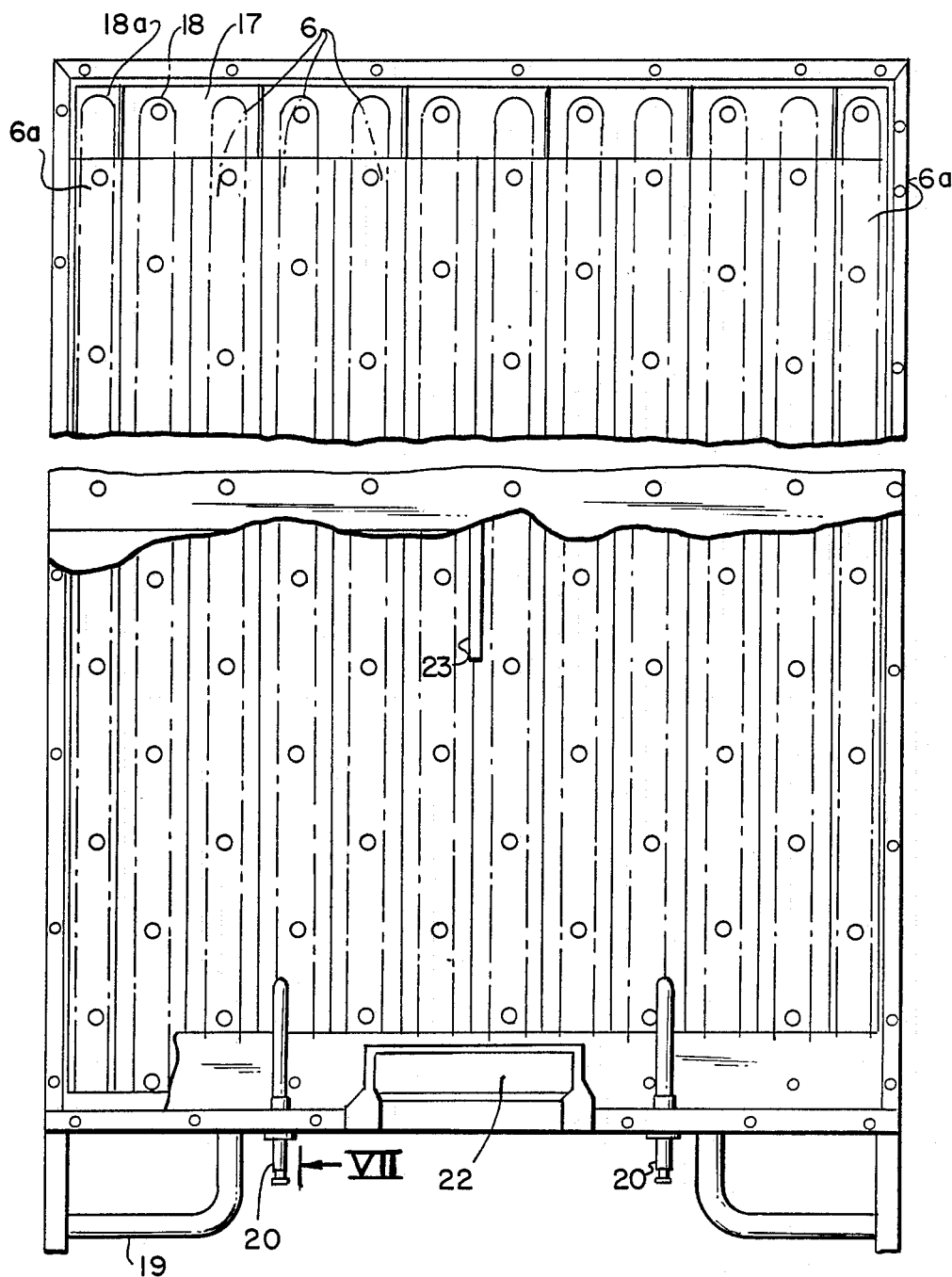

FIG. 3 illustrates the plane view upon portions of a heating plate 1, this being the lower plate part designated with "U". A row of light metal sections 6 arranged next to each other is discernible there, which in their top areas are provided with headpieces 17 into which redirection arcs 18 for the heating wires 8 are milled. The heating wire course is indicated there by a broken dotted line. As is seen also in connection with FIG. 5, the two bar sections 6a arranged at the external edge have somewhat different profiles than the bar sections 6 arranged in the center; here especially the quarter circular bevels arranged at the external edges are missing.

Figure 7:
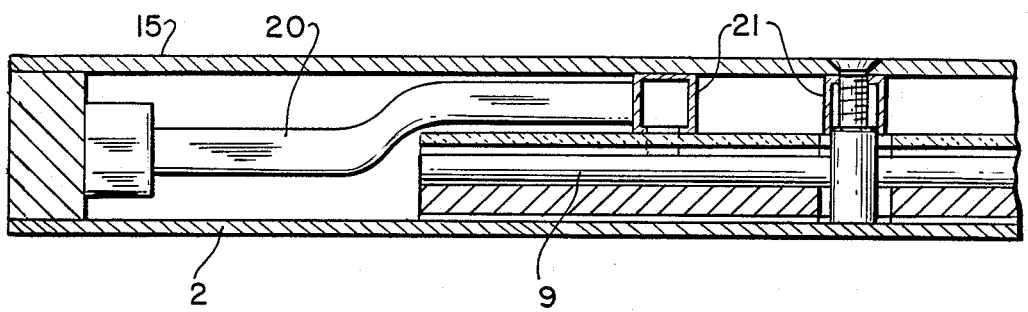

In addition the arrangement of the retaining-, clamping- and carrying handles 19 of the cooling air connections 20 result from FIG. 3, which as is illustrated in FIG. 7 act upon the cooling channels 9 by means of transverse bar sections 21. Simultaneously, the electrical connection is also illustrated in FIG. 3 by indication of a coupling element 22 and merely by way of an example the arrangement of a measuring probe 23 in the center of the plate.

Figure 4:
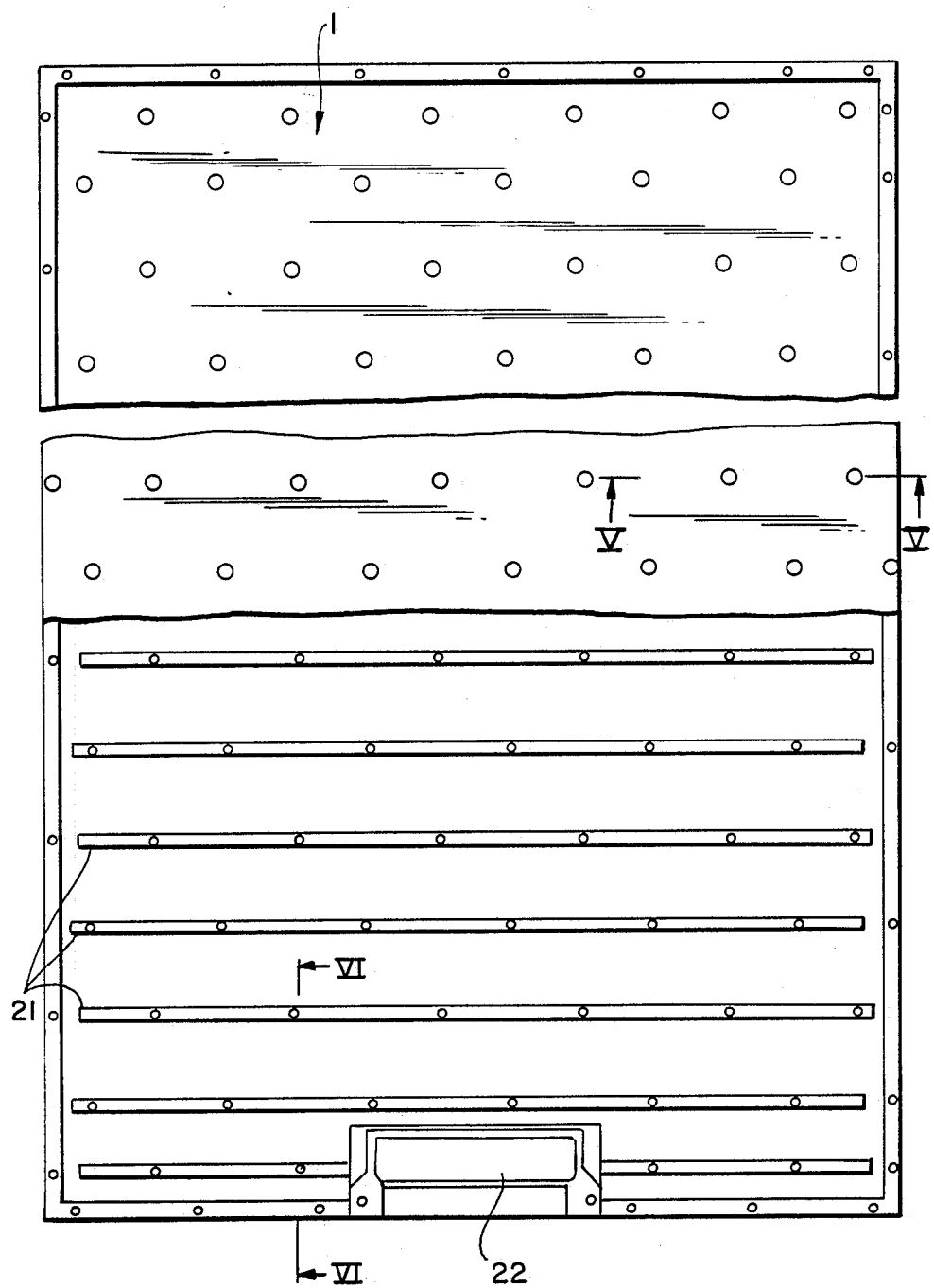

It can be recognized from FIG. 4 that instead of the embodiment form in FIG. 1 no zigzag light metal plate 13 is provided there in the upper plate portion, rather transversely extending light metal hollow sections 21 are present, which serve for the distribution of cooling air according to FIG. 7 as already described as well as for lateral stiffening of the device 1.

Figure 5:
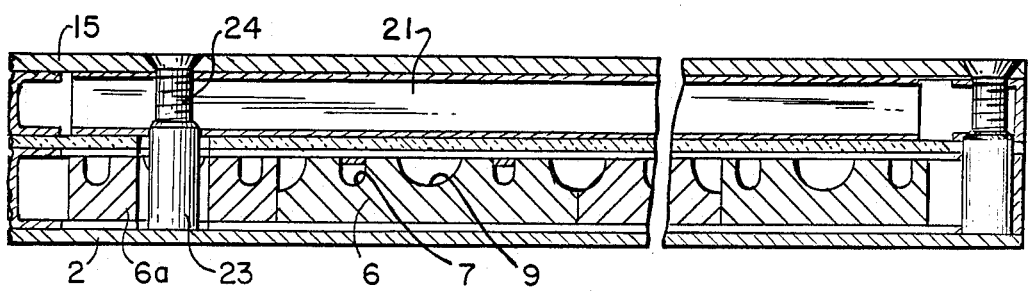
Figure 6:
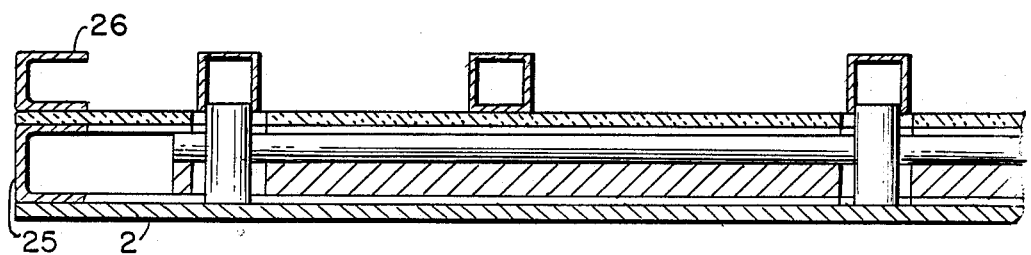

It can be discerned from the cross-sectional FIGS. 5 to 7 that the entire plate structure is held together by connecting bolts 23 with a partial threaded connection 24, whereby precisely the bolts 23 enable a longitudinal extension of the bar sections 6 or 6a and thus the deformability of the plate in longitudinal direction, while the lateral stiffness is assured by the sections 21 or the zigzag plate 13.

Edge sections 25 or 26 from special steel approximately C-shaped in cross-section are provided at the external edges.

Naturally, the embodiment example described can be varied in many ways without departing from the basic thought. Thus, the invention is in particular not limited to the type and arrangement of the longitudinal channels in the light metal bar sections 6. Other arrangements and cross-sectional shapes can also be provided here. So the invention is not limited to the type of winding of the heating elements in FIG. 3. Other patterns can also be provided there, particularly heating circuits actuatable in different ways can be provided for instance in the plate structure viewed from the inside to the outside. The same applies to the type and distribution of the cooling air. It can be useful to lead the connections 20 up to the center of the plate and to arranged there a distribution system for the cooling air oriented from the inside towards the outside.

SUMMARY

In a device for thermally connecting at least two parts, especially ends of conveyor belts, with pressure plates inside of which heating- and cooling elements are provided, a solution is to be created, which improves these already very good pressure plates even further, especially as their economical application, their weight and with this simplification of their handling, their controllability and their heat behavior in operation is concerned.

This is achieved by arranging profiled aluminum bars (6) inside of the plates for formation of heating—(7) and cooling channels (9).

FIG. 1 is published as the drawing in this connection.

We claim:

1. A device for heat bonding at least two conveyor belt ends, with pressure plates having heating and cooling elements on their insides, comprising sectional aluminum bars arranged inside each plate, defining longitudinal heating channels and cooling channels wherein at least some of the channels are connected with each other in end regions thereof arc-shaped channels and wherein each sectional aluminum bar has at least one said heating channel for receiving a heating element and at least one said coating channel being spatially seperated from the one said heating channel.

2. A device according to claim 1 the channels in the aluminum bars being polygonal or circular in cross-section.

3. A device according to claim 1, wherein the heating channels for the heating elements are smaller in cross-section than the cooling channels.

4. A device according to claim 1, a layer of corrugated or zigzag light metal plate and intermediate layers being placed upon the aluminum bars with the heating and cooling channels, profiling of the additional layers being oriented transversely to the heating and cooling channels.

5. A device according to claim 1, wherein the heating channels defined by the bars are at least partially equipped with resistance heating elements arranged in said channels to be longitudinally movable relative to the bars.

6. Device according to claim 1, wherein the aluminum bars are arranged in a steel housing.

7. Device according to claim 1, wherein the aluminum bars together with aluminum cover plates or intermediate plates are enclosed by special steel plates.

8. A device according to claim 1 wherein the heating channels formed by the bars are at least partially equipped with resistance heating elements which are fixed in said channels.

9. A device according to claim 8, the heating elements being arranged in spiral or meamdering shape through a plurality of said heating channels and arc-shaped channels in end plate elements.

10. A device according to claim 1, the heating elements being retained in the heating channels by a flat aluminum bar pressed into each heating channel without inclusion of air.

11. Device according to claim 10, wherein wall structure of a pressure plate facing towards the heating side comprises the following arrangement of layers viewed from the outside towards the inside: steel plate, heat insulating plate, copper plate, heat insulating plate and aluminum profile bars.

* * * * *